United States Patent
Haehnel et al.

(10) Patent No.: US 9,145,269 B2
(45) Date of Patent: Sep. 29, 2015

(54) DEVICE FOR TRANSFERRING PACKAGED MATERIAL TO A PACKAGED MATERIAL TRANSPORT SYSTEM OR TO A STORAGE DEVICE

(75) Inventors: Bernd Haehnel, Stutensee (DE); Rudi Arb, Laupheim (DE); Joachim Huchler, Gutenzell (DE)

(73) Assignee: Uhlmann Pac-Systeme GmbH & Co. KG., Laupheim (DE)

( * ) Notice: Subject to any disclaimer, the term of this patent is extended or adjusted under 35 U.S.C. 154(b) by 1034 days.

(21) Appl. No.: 12/476,659

(22) Filed: Jun. 2, 2009

(65) Prior Publication Data
US 2009/0301841 A1    Dec. 10, 2009

(30) Foreign Application Priority Data

Jun. 9, 2008    (EP) .................................... 08010473

(51) Int. Cl.
| | |
|---|---|
| B65G 47/31 | (2006.01) |
| B65G 47/46 | (2006.01) |
| B65G 47/34 | (2006.01) |
| B65G 47/08 | (2006.01) |
| B65B 5/10 | (2006.01) |

(52) U.S. Cl.
CPC .............. B65G 47/31 (2013.01); B65G 47/082 (2013.01); B65B 5/103 (2013.01)

(58) Field of Classification Search
None
See application file for complete search history.

(56) References Cited

U.S. PATENT DOCUMENTS

| | | | |
|---|---|---|---|
| 3,409,115 A | 11/1968 | Porcaro | |
| 4,506,493 A | 3/1985 | Horton | |
| 4,864,801 A | 9/1989 | Fallas | |
| 5,123,321 A | 6/1992 | Caught | |
| 5,141,128 A * | 8/1992 | Pippin | ............................ 221/84 |
| 5,151,128 A * | 9/1992 | Fukushima et al. | ........ 106/31.46 |
| 5,176,242 A * | 1/1993 | Wegscheider | .............. 198/347.3 |
| 6,092,979 A | 7/2000 | Miselli | |
| 6,161,677 A * | 12/2000 | van der Griendt | ......... 198/487.1 |
| 2006/0201785 A1 * | 9/2006 | Moeller | ........................ 198/618 |

FOREIGN PATENT DOCUMENTS

EP    1 602 584    12/2005

* cited by examiner

*Primary Examiner* — Kavel Singh
(74) *Attorney, Agent, or Firm* — Cozen O'Connor

(57) ABSTRACT

A device for transferring items to a transport system or to a storage unit has a feed unit for conveying a plurality of items in at least one feeding line. Further, it has a transfer station for receiving the items from the feed unit and for transferring the items to the transport system or to the storage device. The transfer station includes two temporary storage lines arranged in parallel. The items are provided by the feed unit in a manner that the items in the first temporary storage line are arranged offset from the items in the second temporary storage line. The temporary storage surfaces in the first temporary storage line have at least one flap to be opened. A pusher in the transfer station is adapted to push the items from the second temporary storage line to the first temporary storage line.

15 Claims, 5 Drawing Sheets

DEVICE FOR TRANSFERRING PACKAGED MATERIAL TO A PACKAGED MATERIAL TRANSPORT SYSTEM OR TO A STORAGE DEVICE

BACKGROUND OF THE INVENTION

1. Field of the Invention

The present invention pertains to a device for transferring items to a transport system or to a storage device.

2. Description of the Related Art

Devices for transferring items are used, for example, to transfer blister packs to the transfer chain of a cartoning machine. U.S. Pat. No. 6,092,979 describes a device for transferring blister packs to a moving blister pack transfer chain, in which two parallel lines of blister packs are transported by two separate conveyor belts. A pickup unit picks up the blister packs, which are initially arranged in parallel rows, and forms a stack of two blister packs, one on top of the other, on each of the two conveyor belts, wherein the individual stacks are arranged a certain distance apart from each other, and the stacks of one conveyor belt are offset from the stacks of the other conveyor belt. Finally, the stacks of blister packs are pushed together by a pusher transversely to the transport direction of the conveyor belts to form a line, so that a row of closely spaced blister pack stacks can be carried onward on a transport belt. A device of this type is subject to considerable limitations with respect to the further processing of the blister stacks, because they can be transported only in the conveying direction of the two conveyor belts. Finally, a device such as this occupies a relatively large amount of space.

A similar device is also known from WO 00/68086, in which individual blister packs, which are arranged in parallel rows, are again deposited with an offset from each other on two conveyor belts by a pickup unit. The conveyor belts work in cycles, and the blister packs are pushed out from the their cassettes toward a transport device located between the two conveyor belts, as a result of which a line of closely spaced blister packs is formed on this transport device. Here, too, however, the blister packs can be conveyed onward only in the transport direction of the conveyor belts, and the device again occupies a relatively large amount of space.

A device in which the individual blister packs are brought up into position one by one by a vacuum belt in a direction parallel to that in which the transport system moves is known from EP 1,602,584 A1. The blister packs are delivered in stacks to the cassette module of a transfer unit. The cassette module can be moved in synchrony with the packaging material transport system, wherein, during the parallel movement, the stacks of blister packs are pushed by pushers into the individual receptacles of the transport system. The cassette module then travels back to its starting position, where it is refilled with blister packs by the vacuum belt. The device is complicated mechanically, occupies a large amount of space because of the movement of the cassette module, and makes it possible to fill only special types of transport devices.

SUMMARY OF THE INVENTION

It is an object of the present invention to provide a device for transferring items to a moving transport system or to a storage device, which occupies only a limited amount of space and can be combined with nearly any desired type of downstream device for the further transport of the items.

According to an aspect of the invention, the device for transferring items to a transport system or to a storage unit comprises:

a feed unit for conveying a plurality of items, the feed unit having at least one feeding line;

a transfer station for receiving the items from the feed unit and for transferring the items to the transport system or to the storage device, the transfer station comprising at least a first and a second temporary storage line arranged in parallel and having temporary storage surfaces for receiving the items from the feed unit, the items being provided by the feed unit in a manner that the items in the first temporary storage line are arranged offset from the items in the second temporary storage line, wherein the temporary storage surfaces in the first temporary storage line comprises at least one flap to be opened; and a pusher in the transfer station adapted to push the items from the second temporary storage line to the first temporary storage line.

Thus, a stationary intermediate storage function is created, which occupies only a limited amount of space and can be used with nearly any desired type of transport system or storage device to which the packaged items can be delivered by the transfer station. The process of transferring the packaged items, furthermore, is subject to hardly any danger of breakdown.

Each temporary storage surface preferably comprises two flaps, which open in opposite directions, as a result of which the transfer process can be completed quickly and in a controlled manner.

The flaps open preferably around axes parallel toward the narrower sides of the temporary storage surface. This guarantees that the packaged items will drop down reliably without flipping over.

For the sake of the variable programmability of the various movements, a servomotor is provided, which serves to drive all of the flaps in a controlled manner.

The temporary storage surfaces of the first temporary storage line with the flaps are preferably lower than the temporary storage surfaces of the other temporary storage lines. As a result, the throughput of the device is considerably increased, and it also becomes possible to stack the packaged items in the lower-lying temporary storage surfaces, as a result of which the transfer station can serve an intermediate storage function, and at the same time the blister packs which have already been stacked can be sent onward for further processing.

Upstream of the feed unit an output device is preferably provided, which makes the packaged items available individually in the form of at least one row perpendicular to the conveying direction of the feed unit. This guarantees that feed unit can be filled simultaneously at a rapid rate.

The feed unit preferably comprises at least one endless vacuum belt. A vacuum belt of this type is suitable in particular for blister packs and can convey them by simple mechanical means.

The feed unit preferably comprises several suction grippers for picking up the packaged material items and for transferring them to the minimum of one vacuum belt. Thus it is guaranteed that several packaged items can be picked up simultaneously and transferred reliably to the vacuum belt.

The feed unit preferably comprises at least two combinations of a stopper and a kicker, wherein one of these combinations is assigned to each feeding line of the feed unit, and wherein the stopper-kicker combinations which are active at the time in question on the different feeding lines are arranged at an offset from each other in the conveying direction of the feed unit. This guarantees that the blister packs on one of the individual feeding lines of the feed unit will be offset in the conveying direction of the vacuum belt from the blister packs on the other lines, wherein the stoppers serve to hold the blister packs in place, whereas the kickers serve to detach the blister packs from the feed unit, whereupon they drop down. In this way, it is possible in an especially simple manner to rearrange the blister packs, which arrive initially in the form of parallel rows, into offset arrangements of blister packs. The combinations of stoppers and kickers can also be arranged in a row extending across several lines, or only one line of the feed unit can be present, which comprises several combinations of stoppers and kickers.

To prevent the blister packs from falling from the vacuum belt prematurely, the feed unit comprises suction bores, which hold the blister packs until all of the stopper-kicker combinations, which are arranged at an offset from each other, are filled with blister packs.

So that the pushing operation can be controlled in a reliable and individually programmable manner, a servomotor is provided to drive the pusher in a controlled manner.

To achieve an even greater increase in the throughput, the feed unit may have three or more parallel feeding lines, and the transfer station may comprise at least three parallel temporary storage lines. The changeover from operation with two feeding lines to operation with three or more feeding lines and vice versa can be accomplished easily at any time.

It is advantageous for the pusher to be designed so that it pushes the packaged items together simultaneously from two sides toward the first temporary storage line with the flaps. As a result, the process of pushing the packaged items can be simplified and shortened.

The transfer station comprises preferably pivotable retaining elements in the area of the temporary storage surfaces for the packaged items to prevent the packaged items which have dropped onto the temporary storage surfaces from bouncing off. This measure is advisable especially in the case of blister packs, the weight of which first moves the retaining elements to the side. The retaining elements then return to their original position and prevent the blister packs from moving upward.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

Additional details, features, and advantages of the present invention can be derived from the following detailed description, for which purpose reference is made to the drawings.

DETAILED DESCRIPTION OF THE PRESENTLY PREFERRED EMBODIMENTS

Figure 1:
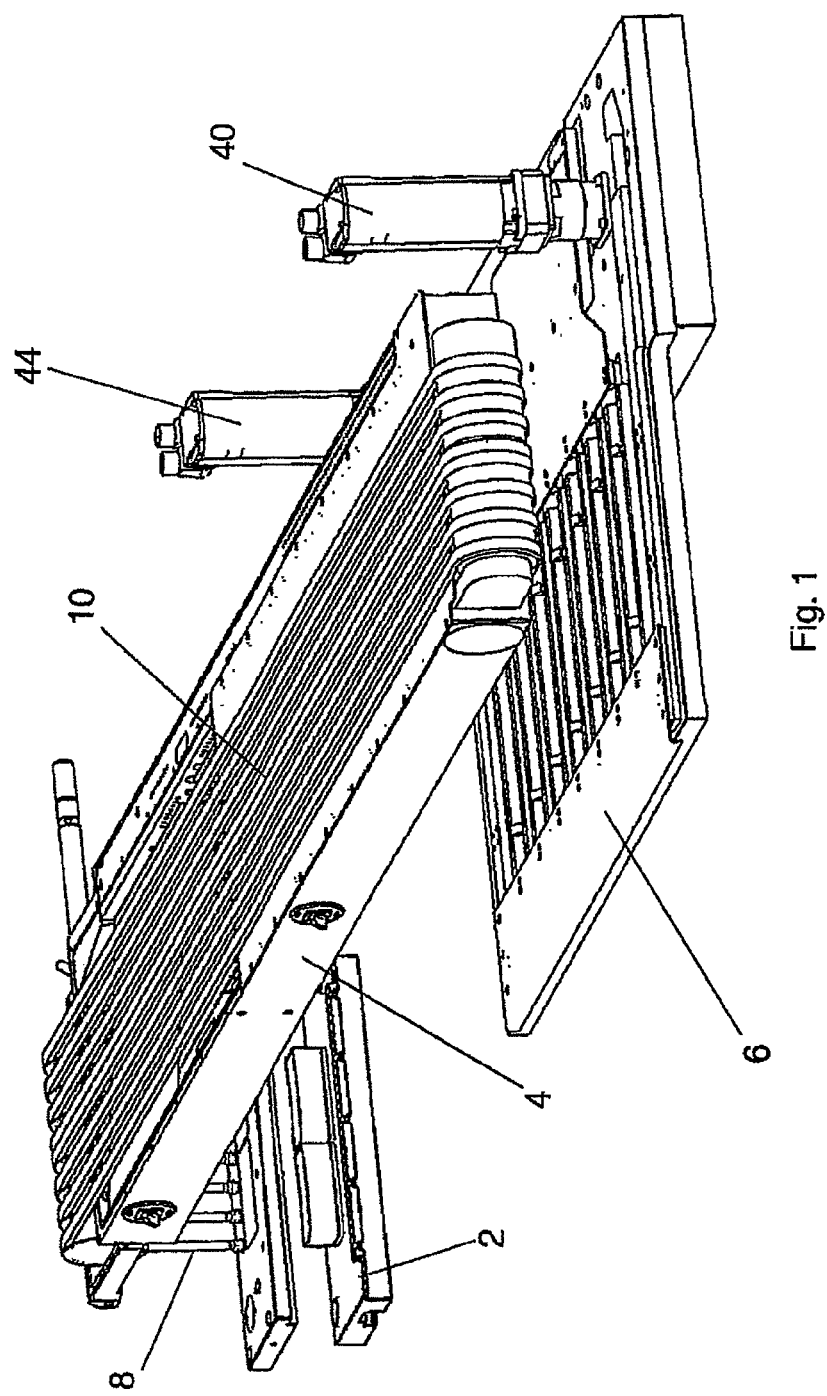
FIG. 1 is a perspective view of a preferred embodiment of the device for transferring packaged material to a transport system or to a storage device.

FIG. 1 shows the main components of a device for transferring items, preferably packaged material, to a transport system or to a storage device. In the present example, the device is designed for the transfer of blister packs, which are stamped out from blister sheets and are made available by an output device 2 of a stamper. The blister packs made available by the output device 2 are conveyed via a feed unit 4 to a transfer station 6 and delivered to it.

In the example shown here, the feed unit 4 comprises several suction grippers 8, which serve to pick up the blister packs made available by the output device 2 of the stamper and carry them up to a vacuum belt 10. The vacuum belt 10 consists of a plurality of transport belts 12, arranged parallel to each other, each of which comprises suction points (not shown). The suction points are arranged in rows transverse to the conveying direction of the vacuum belt 10, on which points the blister packs lifted by the suction grippers 8 to the vacuum belt 10 are held firmly next to each other in a row by suction. The transport belts 12 are designed as endless belts and move at a constant speed.

Figure 2:
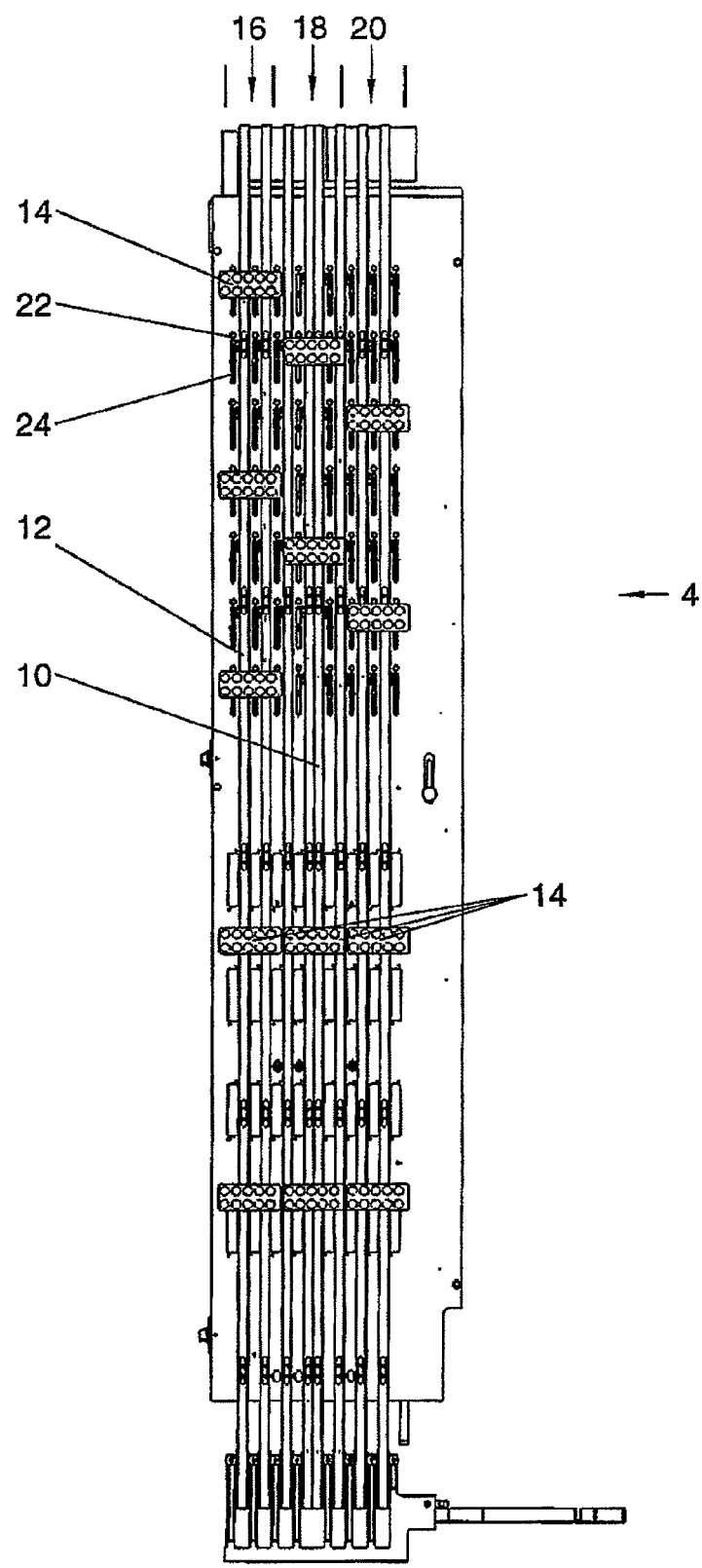
FIG. 2 is a bottom view of a feed unit, which can be used in the device of FIG. 1, designed as a vacuum belt with three parallel feeding lines.

As can be seen in FIG. 2, the packaged items 14, here blister packs, with their pockets facing downward, hang from the suction points of the transport belts 12 and form rows of blister packs 14 arranged next to each other. Each feeding line 16, 18, 20 can consist of one or more transport belts 12 for the transport of individual blister packs 14, but it is also possible for a vacuum belt 10 to be continuous, i.e. to consist of a single belt extending across the entire width of the feed unit 4, not divided into individual transport belts, and to constitute several feeding lines 16, 18, 20 of blister packs 14 simultaneously. In the present example, three feeding lines 16, 18, 20 of the feed unit 4 are arranged parallel to each other, but for the invention it is sufficient to have only two parallel lines or even more than three lines.

Further along in the conveying direction of the feed unit 4, stoppers 22 and kickers 24 are arranged in the area of the vacuum belt 10 to prevent the further transport of the blister packs 14 being conveyed by the vacuum belt 10 and to kick them off the vacuum belt 10. The combinations of stoppers 22 and kickers 24 are distributed at various points along the vacuum belt 10 to form a matrix of rows and columns. According to the invention, the active combinations of stoppers 22 and kickers 24 on the individual feeding lines 16, 18, 20 are arranged with an offset to each other in a first direction, i.e., in the conveying direction of the feed unit 4, so that the blister packs 14 originally conveyed in a row, one next to the other, by the vacuum belt 10 are stopped by the stoppers 22 in positions which are offset from each other. In one feeding line 16, 18, 20, several combinations of stoppers 22 and kickers 24 are preferably provided in a row, one behind the other. The stoppers 22 are preferably designed so that a control unit can move them up and down and thus move them out of the transport path of the conveyed blister packs 14 and then back again. Because of the offset arrangement of the active combinations of stoppers 22 and kickers 24 in the various feeding lines 16, 18, 20, the blister packs 14 in the individual feeding lines 16, 18, 20 will run up against the stoppers 22 at different times. In a simple embodiment with only one feeding line 16, 18, 20, several stoppers 22 are located on this line.

Because the transport belts 12 of the vacuum belt 10 proceed at a continuous speed and thus the suction points of the vacuum belt 10 travel past the blister pack 14 resting against the first stopper 22, this blister pack is no longer held in place on the vacuum belt 10, and it is necessary to prevent such blister packs 14 in some other way from falling off prematurely. For this purpose, the feed unit 4 preferably comprises suction bores in the area of the stoppers 22; these suction bores are suitable for holding the blister packs 14 in place until the kicker 24 in question goes into action. This happens as soon as all combinations of stoppers 22 and kickers 24 are filled with blister packs 14. All of the blister packs are then preferably kicked off simultaneously, and the combinations of stoppers 22 and kickers 24 are available again to receive the next set of blister packs 14.

When a large number of combinations of stoppers 22 and kickers 24 are arranged in a matrix over a relatively long section of the feed unit 4, as shown in FIG. 2, the changeover to a different format or to a different number of feeding lines can be accomplished very easily. It is then possible at any time to change a feed unit 4 with three lines over to an application with two lines and vice versa by actuating the stoppers 22 and kickers 24 in a different manner. It is also easy to adapt the format to handle blister packs 14 of different sizes or other items.

Figure 3:
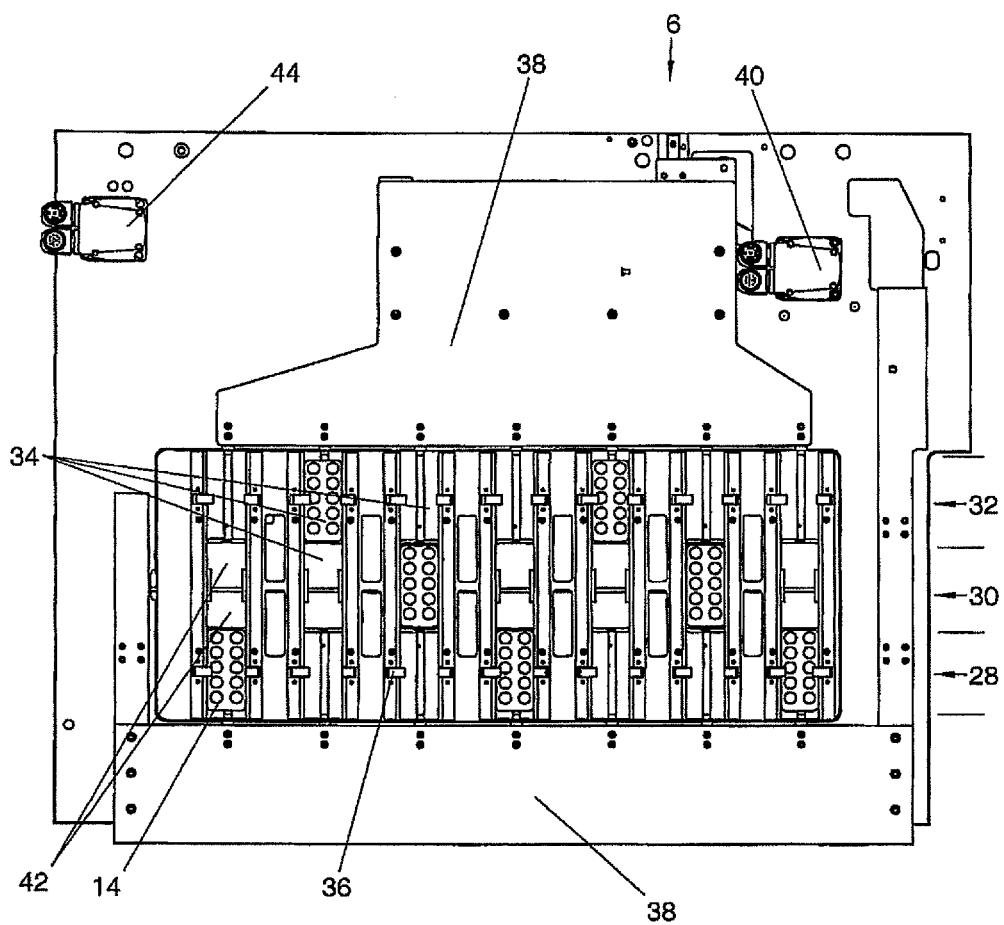
FIG. 3 is a top view of a transfer station, which can be used in the device of FIG. 1, with three temporary storage lines, wherein the central temporary storage line comprises temporary storage surfaces with flaps to be opened.

FIG. 3 shows an embodiment of a stationary transfer station 6 according to the present invention. The transfer station 6 comprises three temporary storage lines 28, 30, 32, thus corresponding to the number of associated feeding lines 16, 18, 20 of the feed unit 4. These temporary storage lines 28, 30, 32 are arranged underneath the feed unit 4. Here, too, the number of temporary storage lines can be varied as desired. In particular, two temporary storage lines are sufficient for the present invention. Each temporary storage line 28, 30, 32 comprises several temporary storage surfaces 34, arranged a certain distance apart, to receive the blister packs 14 made available and delivered by the feed unit 4. Each temporary storage surface 34 corresponds essentially to the shape of the blister pack 14 and has low edges to hold the blister packs 14 in place. For the transfer of the blister packs 14, two opposing, downward-pivoting retaining elements 36 for the blister packs 14 are preferably arranged along the longer side edges of each temporary storage surface 34. These retaining elements 36 are pivoted out of the way by the arriving blister pack 14, but they return to their original position again under the force of a spring and then prevent the blister pack 14 from bouncing up. As an alternative to these retaining elements, it would also be possible to use a targeted jet of air directed downward from above.

Figure 4:
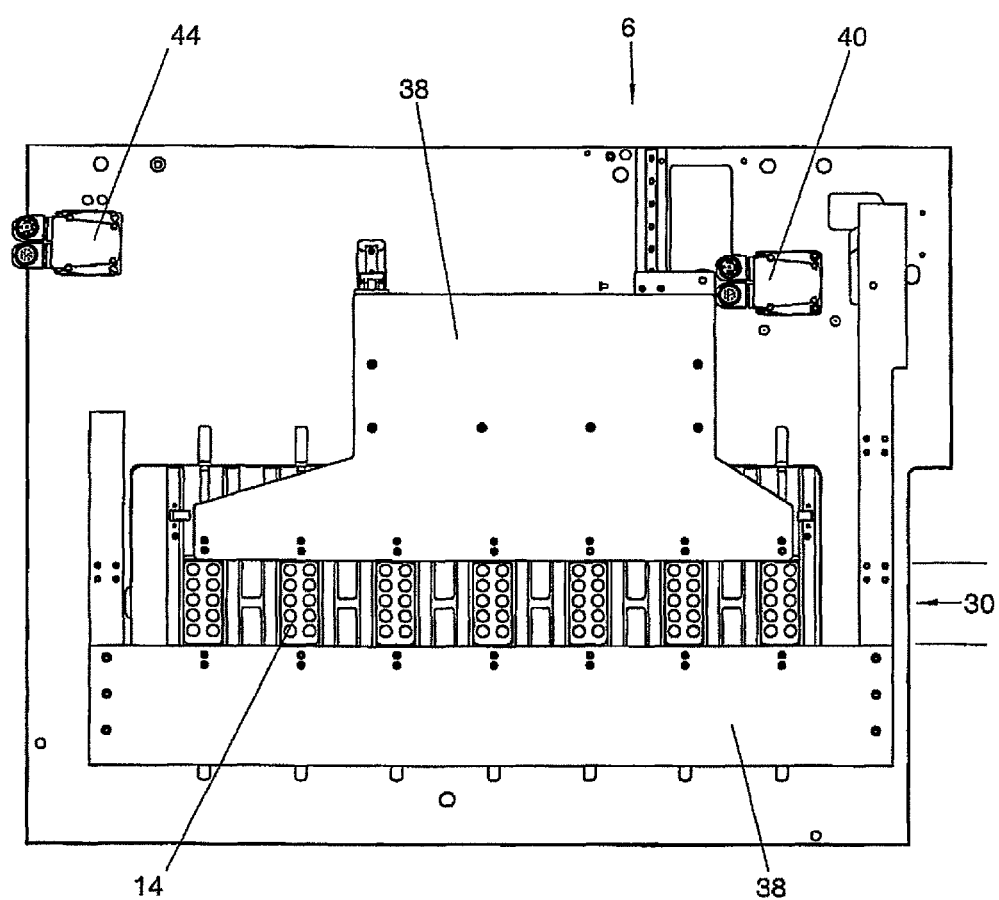
FIG. 4 shows the transfer station of FIG. 3 after the blister packs have been pushed into the central temporary storage line.
Figure 5:
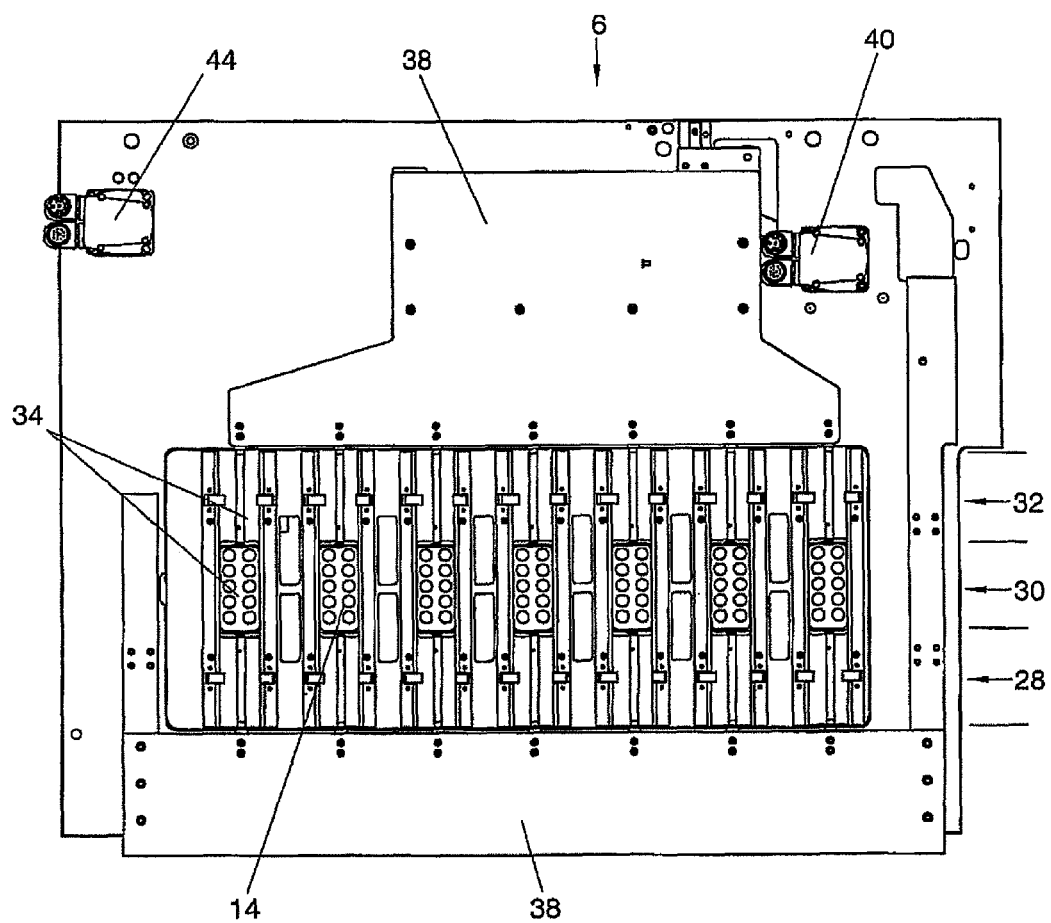
FIG. 5 shows the transfer station of FIGS. 3 and 4 in a state immediately before additional blister packs are received in the transfer station.

A first temporary storage line—the central temporary storage line 30 in the example shown here—can be equipped with lower-lying temporary storage surfaces 34 to guarantee that several blister packs 14 can be stacked on top of each other in this temporary storage line. This first temporary storage line 30 can therefore serve as intermediate storage. A pusher 38, actuated by a servomotor 40, now pushes together the blister packs 14 from the various temporary storage lines 28, 30, 32 to form a single temporary storage line—the central temporary storage line 30 in the example shown here (see FIG. 4). For this purpose, the pusher 38, acting uniformly from both sides, is designed in such a way that it pushes the blister packs 14 out of the outer two second and third temporary storage lines 28 and 32 toward the first temporary storage line 30 until they occupy the temporary storage surfaces 34 present there. The end state of the pushing operation is shown in FIG. 4.

As can best be seen in FIG. 3, the first temporary storage line 30 has temporary storage surfaces 34 comprising at least one flap 42 to be opened. In the example shown here, two flaps 42, which open to different sides, are provided. In the specific embodiment, the flaps open downward, one to the right and one to the left, around axes parallel to the narrower sides of the temporary storage surfaces 34. A servomotor 44 serves to drive the flaps 42 in a controlled manner. It is also conceivable that the flaps 42 could open toward the wider side of the temporary storage surface 34 or that only one downward-opening flap 42 could be provided per temporary storage surface 34. The exemplary embodiment shown here, however, offers the advantage that the blister packs 14 are reliably prevented from flipping over as they drop down.

The blister packs 14 which have dropped between the opened flaps 42 are either taken over directly by a transport system (not shown) or sent to a storage device (also not shown).

The inventive device for transferring items to a transport system or to a storage device operates in the following manner. First, the items, here blister packs 14, made available by the output device 2 are lifted up by the suction grippers 8 and passed along to the vacuum belt 10. They are then transported in parallel rows until a blister pack 14 strikes a stopper 22 in a first feeding line 16. The other blister packs 14 in the other feeding lines 18, 20 are carried onward by the continuously running transport belts 2 until each of them also strikes an associated stopper 22. The blister packs 14 are held in place in the area of the stoppers 22 by suction bores of the feed unit 4 until all of the desired kicker positions are occupied by blister packs 14, at which point the kickers 24 kick the blister packs down off the vacuum belt 10. The blister packs 14 drop down and land on the temporary storage surfaces 34, which correspond to the format of the blister packs and are arranged in as many temporary storage lines 28, 30, 32 as there are feeding lines 16, 18, 20 in the feed unit 4.

Then the blister packs 14 are pushed out of the temporary storage lines 28, 30 32 into the first temporary storage line 30 in a second direction perpendicular to the conveying direction of the feed unit 4, where they are either discharged immediately downward by the opening of the flaps 42 or wait for another layer of blister packs 14, which is deposited on top of the first layer. After the flaps 42 have been opened and the blister packs 14 or the stacks of blister packs have therefore been transferred to a transport system or to a storage device, the cycle can be begin again.

A wide variety of modifications can be made to the example presented here. In the example given, the device transfers blister packs, but the items 14 which are transferred could also be other pharmaceutical products such as vials, ampules, bottles, tubular bags, etc., provided that the feed unit 4 is adapted appropriately and operates with appropriate suction/gripping devices in place of the vacuum belt. It is also possible for the items on the temporary storage lines 28, 30, 32 to be pushed only from one side to produce a row of packaged items in one of the outer temporary storage lines 28 or 32. The direction in which the packaged items 14 are pushed across the temporary storage lines 28, 30, 32 can be done not only, as shown so far, in the direction transverse to the conveying direction of the feed unit 4 but also parallel to that. As a result, the individual packaged items 14 would, after being pushed, be in a temporary storage line oriented transversely to the conveying direction of the feed unit 4. The flaps can also be movable in a horizontal direction instead of being rotatable.

As previously explained, the number of feeding lines in which the packaged items are transported at an offset from each other and the number of temporary storage lines are optional. The larger the number of feeding lines, the higher the throughput. Nevertheless, the present invention can also be realized even if only two temporary storage lines are present overall, if one of them is equipped with the inventive flaps 42.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A device for transferring blister packs to a transport system or to a storage unit, the device comprising:
   a feed unit for conveying a plurality of blister packs, the feed unit having at least one feeding line;
   a transfer station for receiving the blister packs from the feed unit and for transferring the blister packs to the transport system or to the storage device, the transfer station comprising at least a first and a second temporary storage line arranged in parallel and having temporary storage surfaces for receiving the blister packs from the feed unit, the temporary storage surfaces corresponding substantially to the shape of the blister packs, the blister packs being provided by the feed unit in a manner that the blister packs in the first temporary storage line are arranged offset from the blister packs in the second temporary storage line, wherein each of the temporary storage surfaces in the first temporary storage line comprises at least one flap to be opened in order to allow the blister packs to drop downward; and
   a pusher in the transfer station adapted to push the blister packs from the second temporary storage line to the first temporary storage line.

2. The device according to claim 1, wherein each temporary storage surface comprises two flaps, which open to different sides.

3. The device according to claim 2, wherein the flaps open downward around axes parallel to a narrower side of the temporary storage surfaces.

4. The device according to claim 1, further comprising a servomotor to drive the at least one flap in a controlled manner.

5. The device according to claim 1, wherein the temporary storage surfaces of the first temporary storage line are arranged lower than the temporary storage surfaces of the second temporary storage line.

6. The device according to claim 1, wherein the feed unit comprises at least two endless vacuum belts each defining a feeding line.

7. The device according to claim 6, wherein the feed unit comprises at least two combinations of a stopper and a kicker, wherein at least one combination is assigned to each feeding line, the combinations being arranged with an offset from each other in a first direction.

8. The device according to claim 7, wherein the feed unit comprises suction bores associated with each of the combinations.

9. The device according to claim 1, further comprising a servomotor to move the pusher in a controlled manner.

10. The device according to claim 1, wherein the feed unit has at least three parallel feeding lines, and the transfer station comprises at least three parallel temporary storage lines.

11. The device according to claim 10, wherein the pusher is designed in such a way that it pushes the blister packs simultaneously from two sides toward the first temporary storage line.

12. The device according to claim 1, wherein the feed unit comprises at least two endless vacuum belts each defining a feeding line, and each feeding line being adapted to suspend the blister packs therefrom.

13. The device according to claim 12, wherein the feed unit comprises at least two combinations of a stopper and a kicker, wherein at least one combination is assigned to each feeding line, the combinations being arranged with an offset from each other in a first direction.

14. The device according to claim 13, wherein the feed unit comprises suction bores associated with each of the combinations.

15. The device according to claim 13, wherein the feed unit and the transfer station are arranged and dimensioned so that the blister packs drop down from the feed unit and land on the temporary storage surfaces in response to an actuation of the kickers.

* * * * *